United States Patent [19]

Francis

[11] 4,343,564
[45] Aug. 10, 1982

[54] ROTATABLE MEMBER RIGIDLY MOUNTED ON AN UNDERSIZE SHAFT
[75] Inventor: Roderick M. Francis, Garner, N.C.
[73] Assignee: Stackpole Components Company, Raleigh, N.C.
[21] Appl. No.: 234,800
[22] Filed: Feb. 17, 1981
[51] Int. Cl.³ ............................................. F16D 1/06
[52] U.S. Cl. .................................... 403/362; 403/365
[58] Field of Search .................... 403/362, 365, 3, 354
[56] References Cited

U.S. PATENT DOCUMENTS

| | | | |
|---|---|---|---|
| 2,043,418 | 6/1936 | Newmark | 403/3 |
| 3,708,243 | 1/1973 | Wooden | 403/362 |
| 3,851,985 | 12/1974 | Coleman | 403/362 |

FOREIGN PATENT DOCUMENTS 329137  5/1958  Switzerland .................. 403/362

Primary Examiner—Andrew V. Kundrat
Attorney, Agent, or Firm—Brown, Flick & Peckham

[57] ABSTRACT

A rotatable member is provided with an axial bore that receives one end of an undersized shaft. To fill the space between the shaft and the wall of the bore and to center the shaft in the bore, the portion of the shaft that is in the bore is encircled by a sleeve provided with a longitudinal slot extending outwardly from its inner end. A set screw threaded in the rotatable member extends through the slot and tightly engages the shaft to rigidly connect the rotatable member and shaft together.

2 Claims, 3 Drawing Figures

ROTATABLE MEMBER RIGIDLY MOUNTED ON AN UNDERSIZE SHAFT

It is the general practice to attach a rotatable member, such as a radio control knob, a pulley, a gear or the like to a rotatable shaft by providing the rotatable member with an axial bore for receiving an end portion of the shaft. A set screw threaded in the rotatable member bears tightly against the side of the shaft in the bore to rigidly connect the rotatable member and shaft. Occasionally it is desired or necessary to use a shaft that is materially smaller than the diameter of the bore. By "materially" is meant a bigger difference in diameters than required for inserting the shaft in the rotatable member. In such cases, if the set screw were tightened against the undersize shaft, the shaft would not be centered in the bore, with the result that the rotatable member would be mounted eccentrically on the shaft.

It is among the objects of this invention to provide an assembly in which there is simple and inexpensive means for centering an undersize shaft in the bore of a rotatable member that is to be rigidly mounted on the shaft.

Figure 1:
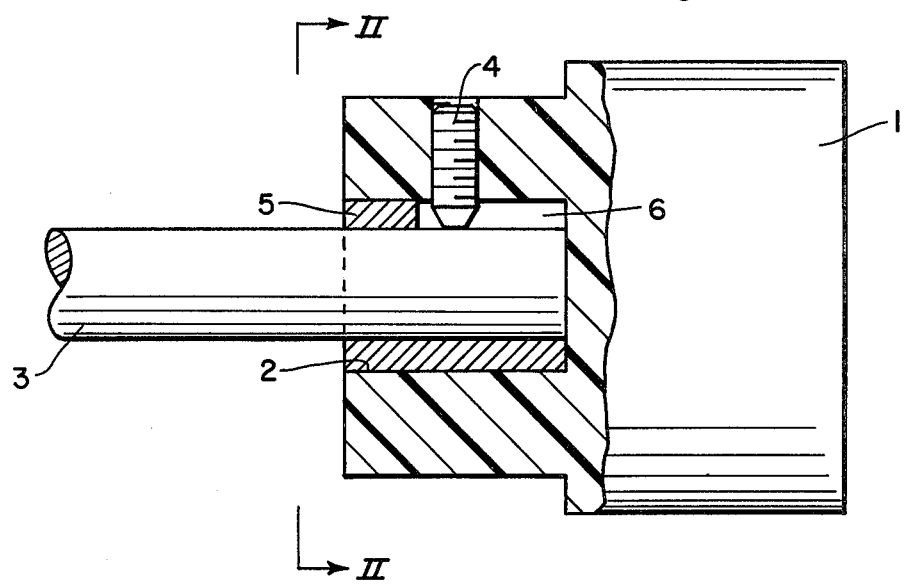
Figure 2:
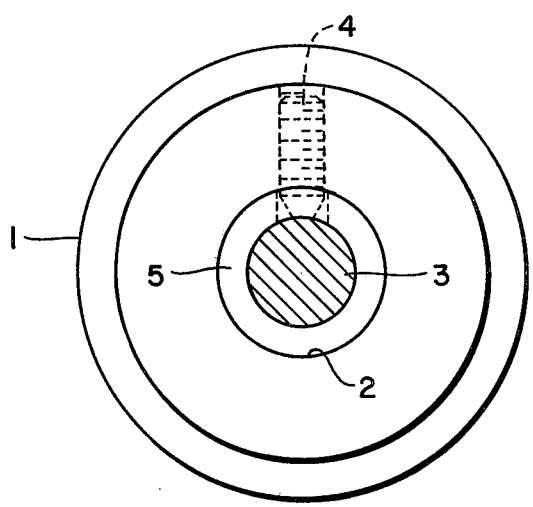
Figure 3:
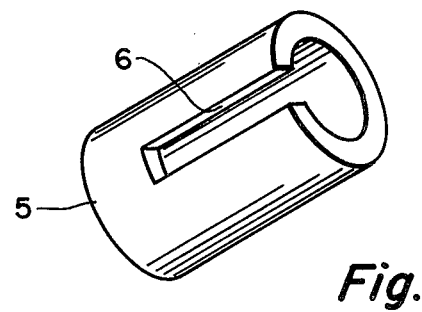

The preferred embodiment of the invention is illustrated in the accompanying drawings, in which FIG. 1 is a side view, partly in section, of a knob mounted on one end of a rotatable shaft;

FIG. 2 is a view of the inner end of the knob taken on the line II—II of FIG. 1; and FIG. 3 is a perspective of the adapter sleeve.

Referring to FIGS. 1 and 2 of the drawings, a rotatable member of any desired type, such as the control knob 1 of a radio receiver, is provided with an axial bore 2 for receiving one end of a shaft 3 that the knob is to turn. The shaft is held in place by a set screw 4 threaded in the knob and extending radially of the bore, into which it projects. The shaft is undersize as compared with the diameter of the bore. That is, the diameter of the shaft is materially less than the diameter of the bore, so that if the shaft alone were centered in the bore there would be an annular space around the shaft.

It is a feature of this invention that the space between the wall of the bore in the knob and the side of the shaft is filled and that the shaft is held in the center of the bore. Accordingly, a sleeve 5, shown in FIG. 3, is provided that fits around the end portion of the shaft in the bore and preferably is the same length as the bore. The thickness of the wall of the sleeve is just great enough to fill the space between the shaft and the encircling wall of the bore as shown in FIGS. 1 and 2. The sleeve is provided with a slot 6 that extends outwardly from its inner end, the end at the inner end of the bore. The slot is wide enough to permit the inner end of set screw 4 to extend through the slot and engage the side of the shaft. Preferably, the outer end of the slot terminates between the screw and the outer end of the sleeve so that the outer end portion of the sleeve completely encircles the shaft.

This adapter or filler sleeve permits undersize shafts to be used with rotatable members and yet be centered in the bores receiving them. The sleeve can be made of any suitable material, such as metal or plastic, and it can be formed by any conventional method, such as molding, machining or die casting.

To assemble these elements, the set screw is turned inwardly just far enough for its inner end to project a short distance into the bore in the knob. Then the sleeve is inserted in the bore, open end of slot 6 first, by first lining up the slot with the exposed inner end of the set screw and then pushing the sleeve into the bore. The inner end of the screw will project part way through the slot. The knob and sleeve are then slipped over the end of the shaft, and the set screw is tightened to securely connect the knob and shaft together.

This adapter sleeve can also be used where a knob or other rotatable member is to be removed from a shaft rather frequently. If the shaft fit the bore in the knob, tightening of the set screw might form a burr on the shaft which could make is difficult to remove the knob. That difficulty can be avoided by using an undersize shaft and the adapter sleeve disclosed herein. The knob then can be pulled off the sleeve easily after the set screw has been loosened, even through a burr may have been formed on the shaft. The burr cannot interfere with removal of the knob from the sleeve, which can remain on the shaft.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In combination, a rotatable shaft, a rotatable member provided with a cylindrical axial bore receiving one end of the shaft, the diameter of the shaft being materially less than the diameter of the bore, a set screw threaded in said member radially of said bore and projecting into the bore, and a cylindrical sleeve encircling the shaft in the bore and centering the shaft in the bore, the sleeve being provided with a longitudinal slot extending outwardly from its inner end, and said screw extending through said slot and tightly engaging the shaft to rigidly connect said rotatable member and shaft, said slot being wide enough to permit it to be moved along the projecting inner end of the screw when the sleeve is inserted in said bore.

2. In the combination recited in claim 1, the outer end of said slot terminating between said screw and the outer end of said sleeve, whereby a portion of said shaft is completely encircled by the sleeve.

* * * * *